United States Patent
Hu et al.

(10) Patent No.: US 11,752,865 B1
(45) Date of Patent: Sep. 12, 2023

(54) OFF-ROAD CLUTCH CONTROL

(71) Applicant: FORD GLOBAL TECHNOLOGIES, LLC, Dearborn, MI (US)

(72) Inventors: Guopeng Hu, Northville, MI (US); Ashok Eugene Rodrigues, Farmington Hills, MI (US); Zhengyu Dai, Canton, MI (US); Peter James Barrette, Jupiter, FL (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/988,353

(22) Filed: Nov. 16, 2022

(51) Int. Cl.
 B60K 23/08 (2006.01)

(52) U.S. Cl.
 CPC .. B60K 23/0808 (2013.01); *B60K 2023/0841* (2013.01); *B60K 2023/0858* (2013.01); *B60W 2510/0291* (2013.01); *B60W 2555/00* (2020.02); *B60W 2710/029* (2013.01); *B60W 2710/0677* (2013.01)

(58) Field of Classification Search
 CPC ........ B60K 23/0808; B60K 2023/0841; B60K 2023/0858; B60W 2510/0291; B60W 2555/00; B60W 2710/029; B60W 2710/0677
 See application file for complete search history.

(56) References Cited

U.S. PATENT DOCUMENTS

| | | | |
|---|---|---|---|
| 7,630,812 B2 | 12/2009 | Jiang et al. | |
| 8,246,520 B2 | 8/2012 | Ginther | |
| 8,868,308 B2 | 10/2014 | Guegan et al. | |
| 9,919,709 B2 | 3/2018 | Percy | |
| 11,371,602 B1 * | 6/2022 | Bruns | F16H 59/46 |
| 2016/0121904 A1 | 5/2016 | Prakah-Asante et al. | |
| 2020/0005555 A1 * | 1/2020 | Fiello | G07C 5/008 |

FOREIGN PATENT DOCUMENTS

| | | | | |
|---|---|---|---|---|
| CN | 113357027 A | | 9/2021 | |
| DE | 102020122618 A1 * | 3/2021 | ............ | B60W 20/13 |
| WO | WO-2020243819 A1 * | 12/2020 | ............ | B60K 23/02 |

* cited by examiner

*Primary Examiner* — Justin Holmes
(74) *Attorney, Agent, or Firm* — Vincent Mastrogiacomo; Brooks Kushman P.C.

(57) ABSTRACT

A vehicle includes an engine, a primary axle drivably connected to the engine, and a secondary axle drivably connected to the engine by a clutch. A controller is programmed to, in response to map data indicating that the vehicle is off-road, enable an off-road transfer torque control mode in which temperatures of the clutch are compared to a lower threshold. The controller is further programmed to, in response to the temperature of the clutch exceeding the lower threshold, display a message to a driver indicative of rising temperatures of the clutch, and, in response to a temperature of the clutch exceeding an upper limit, enable a power limiting mode in which torque of the engine is limited to a predefined value.

20 Claims, 4 Drawing Sheets

US 11,752,865 B1

OFF-ROAD CLUTCH CONTROL

TECHNICAL FIELD

The present disclosure relates to off-road driving and more particularly to clutch control and monitoring during off-road driving.

BACKGROUND

Vehicles include one or more driven wheels for propelling the vehicle. Some vehicles include all-wheel drive or four-wheel drive in which all four wheels are driven wheels, at least during some modes of operation. A four-wheel drive vehicle may include a transfer case that selectively couples a secondary axle to the engine.

SUMMARY

According to one embodiment, a vehicle includes an engine, a primary axle drivably connected to the engine, and a secondary axle drivably connected to the engine by a clutch. A controller is programmed to, in response to map data indicating that the vehicle is off-road, enable an off-road transfer torque control mode in which temperatures of the clutch are compared to a lower threshold. The controller is further programmed to, in response to the temperature of the clutch exceeding the lower threshold, display a message to a driver indicative of rising temperatures of the clutch, and, in response to a temperature of the clutch exceeding an upper limit, enable a power limiting mode in which torque of the engine is limited to a predefined value.

According to another embodiment, a vehicle includes a powertrain having a clutch and a controller. The controller is programmed to, during on-road driving, compare a temperature of the clutch to a higher threshold and, responsive to the temperature of the clutch exceeding the higher threshold, display a message indicative of rising temperatures of the clutch. The controller is further programmed to, during off-road driving, compare the temperature of the clutch to a lower threshold and, responsive to the temperature of the clutch exceeding the lower threshold, display the message.

According to yet another embodiment, a method of controlling a clutch of a vehicle during off-road driving includes, in response to map data indicating that the vehicle is off-road, enabling an off-road transfer torque control mode in which temperatures of the clutch are compared to a lower threshold; and, in response to the temperature of the clutch exceeding the lower threshold, displaying a message to a driver indicative of rising temperatures of the clutch.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
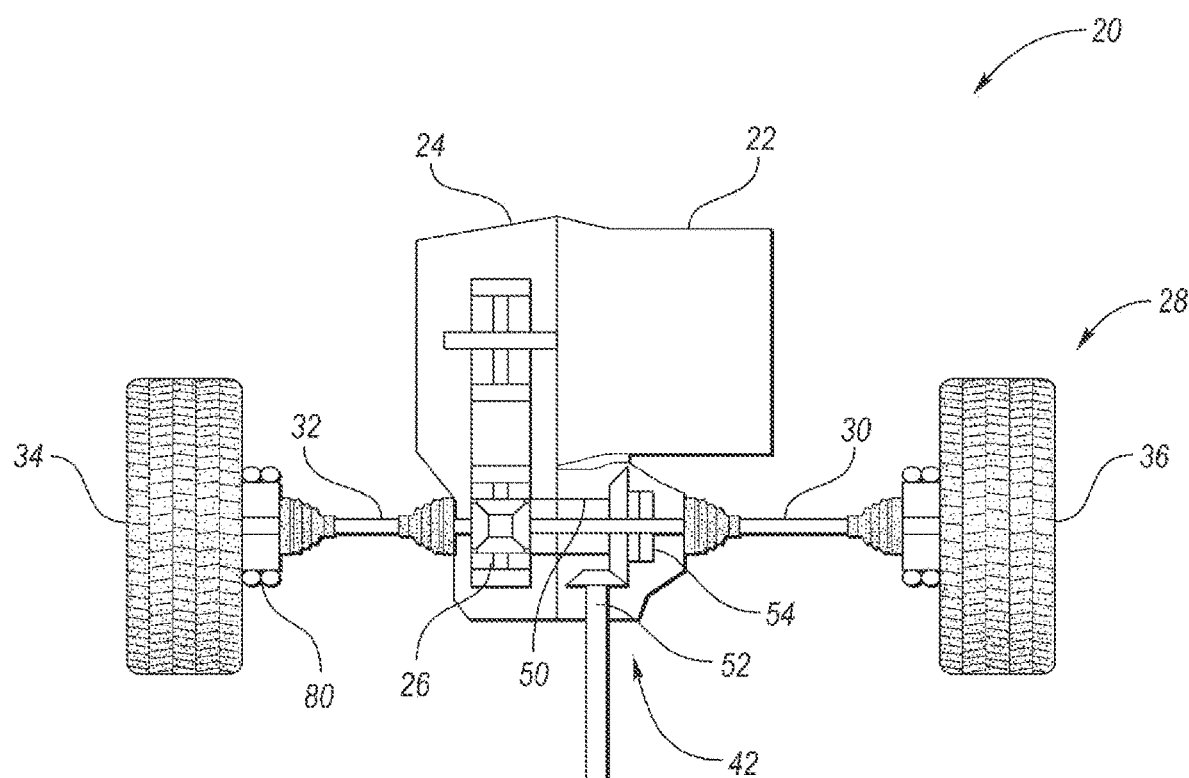
FIG. 1 illustrates a schematic diagram of a vehicle powertrain according to a first embodiment.
Figure 1:
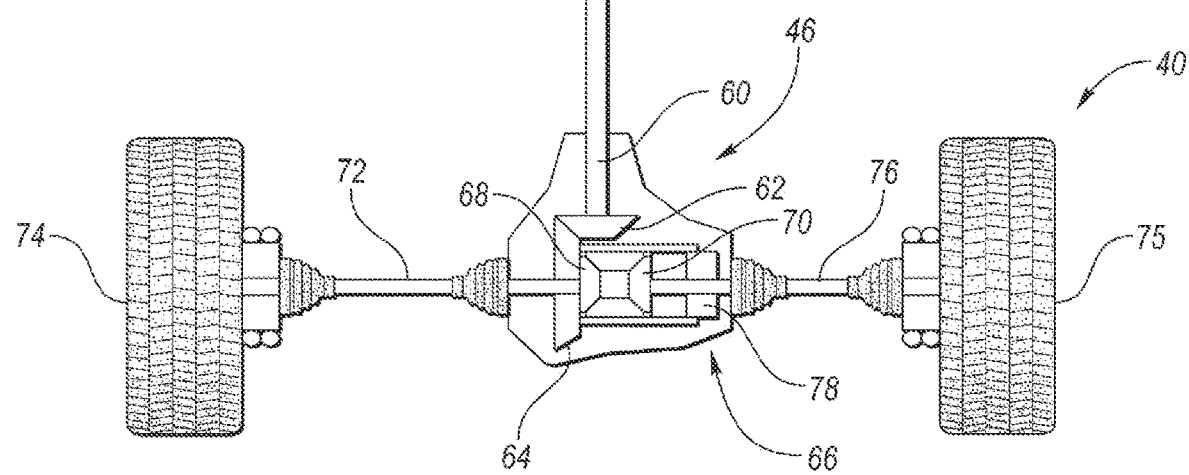
Figure 2:
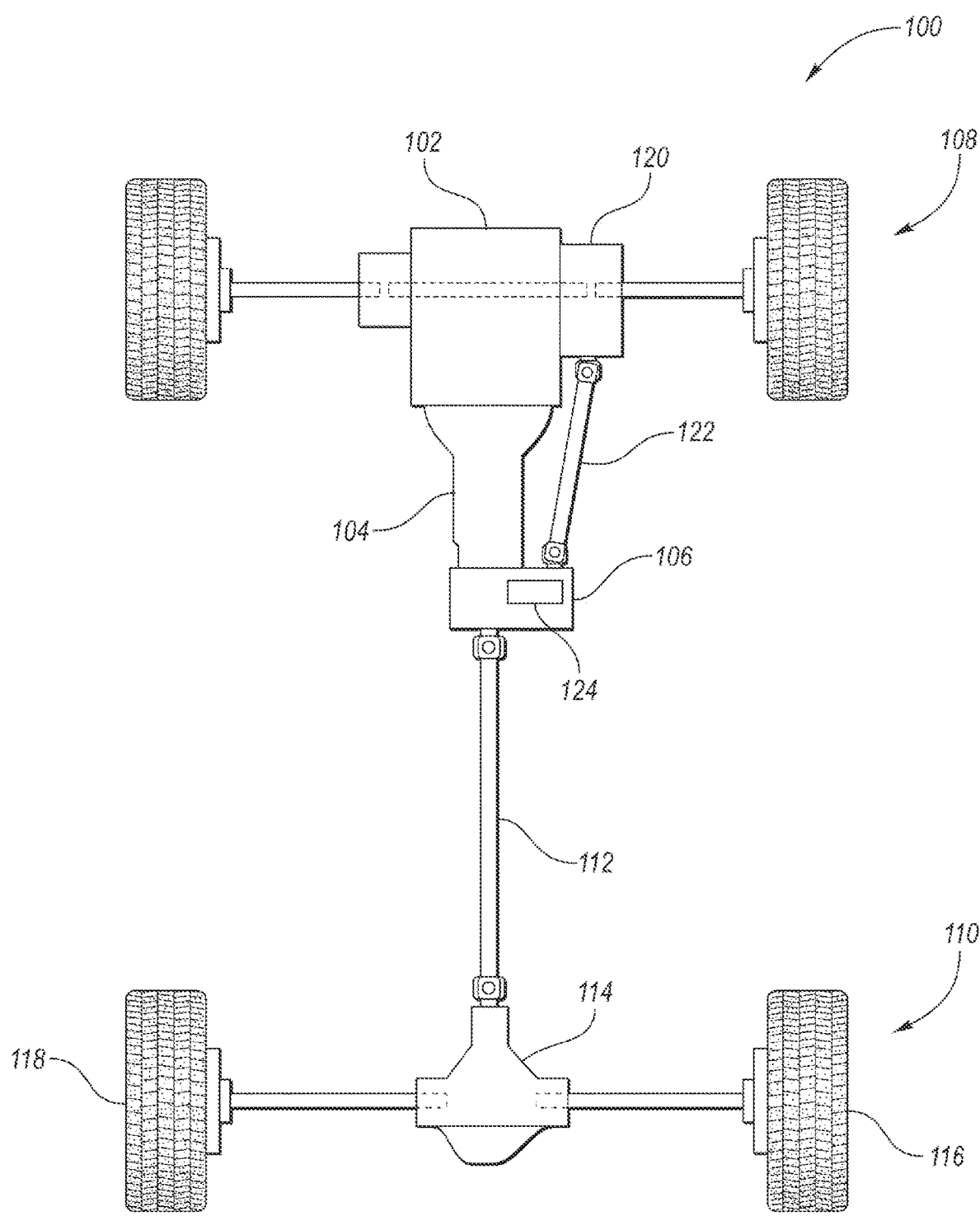
FIG. 2 illustrates a schematic diagram of a vehicle powertrain according to a second embodiment.

Referring to FIG. 1, an all-wheel-drive vehicle 20 includes a powerplant 22 such as an internal-combustion engine or an electric machine. In the illustrated embodiment, the powerplant 22 is an internal combustion engine configured to operate on gasoline, diesel or other fuel. The engine 22 may be mounted transversely in the vehicle 20 (as shown) or longitudinally (as shown in FIG. 2). A transmission 24 (e.g., a transaxle) is coupled to the engine 22. The transmission 24 may be a multi-speed transmission such as an automatic or manual transmission. The transmission 24 includes an output that is coupled to a differential 26 associated with the front axle 28. The differential 26 receives power from the transmission and outputs that power to the halfshafts 30, 32 of the front axle 28. In the illustrated embodiment, the vehicle 20 is biased to front-wheel drive and the front axle 28 is the primary axle. As the primary axle, the engine 22 and the front wheels 34, 36 are drivably connected whenever the transmission 24 is in gear, e.g., DRIVE. Two components are drivably connected if they are connected by a power flow path that constrains their rotational speeds to be directly proportional.

The rear axle 40 is the secondary axle and selectively receives power from the engine 22 as needed. For example, the secondary axle 40 may receive power from the engine 22 when traction of the front wheels 34, 36 is limited, when the engine 22 is producing high power, or other conditions known in the art. As will be explained in more detail below, one or more clutches drivably connect the secondary axle to the powerplant. Two components are drivably connected if they are connected by a power flow path that constrains their rotational speeds to be directly proportional. The rear axle 40 is operably coupled to the engine 22 by a power-transfer unit (PTU) 42, a driveshaft 44, and a rear-drive unit (RDU) 46. The PTU 42 includes an input 50, e.g., a shaft or case, that is fixedly coupled to the differential 26 and an output 52 that is fixedly coupled to the driveshaft 44. A group of rotating elements are fixedly coupled to one another if they are constrained to rotate as a unit in all operating conditions. Rotating elements can be fixedly coupled by spline connections, welding, press fitting, machining from a common solid, damper connections, or other means. Slight variations in rotational displacement between fixedly coupled elements can occur such as displacement due to lash or shaft compliance, and damper oscillations.

A clutch 54 selectively couples the input 50 and the output 52. Two rotating elements are selectively coupled when the elements are constrained to rotate together in a first condition and are free to rotate at unrelated speeds in one or more other conditions. When the clutch is engaged, the driveshaft 44 receives power. When the clutch is disengaged, the driveshaft 44 does not receive power. Generally, the clutch 54 is engaged when the vehicle is in an all-wheel-drive mode and is disengaged when the vehicle is in a front-wheel drive mode.

The RDU 46 includes an input 60 fixedly coupled to the driveshaft 44. The input 60 may include a shaft that supports a pinion gear 62. The pinion 62 may mesh with a bevel gear 64 of a differential 66. The differential 66 may be an open differential. The differential 66 includes a carrier that supports the bevel gear 64, a pair of spider gears, and a pair of side gears 68, 70. The side gear 68 may be fixedly coupled to the halfshaft 72 to provide power to the driver side rear wheel 74. In contrast, the side gear 70 is selectively coupled to the halfshaft 76 by a clutch 78. When the clutch 78 is engaged, the halfshaft 76 is coupled to the side gear 70, and when the clutch 78 is disengaged, the halfshaft 76 is decoupled from the side gear 70. Used herein "engaged" includes both full engagement of the clutch (locked) and partially engagement of the clutch (slipping). Used herein "disengaged" refers to an open clutch in which torque is not transferred across the clutch.

The clutch 78 may be a multi-plate wet clutch that includes a clutch pack. The clutch pack includes a first set of friction plates rotationally fixed to the side gear 70 and a second set of friction disks rotationally fixed to the halfshaft 76. An actuator of the clutch 78 is configured to compress the plates and disks together to create clutch capacity, i.e., torque transfer through the clutch. The actuator may be an electronic actuator, such as an electric motor, that is configured to compress the clutch pack to engage the clutch. In one or more example embodiments, an electric motor drives a ball-ramp mechanism that increases and decreases the force applied to the clutch pack to control clutch capacity. Of course, other types of mechanisms may be used in other embodiments.

The vehicle 20 may be switched between all-wheel propulsion and front-wheel propulsion by engaging and disengaging the clutch 78. When the clutch 78 is disengaged, power cannot flow from the input 60 to the wheels 74, 75 of the rear axle 40; thus, the vehicle is in front-wheel drive. When the clutch 78 is engaged, power flows to the rear axle and to propel the vehicle using both the front axle 28 and the rear axle 40, i.e., all-wheel drive. The clutch 78 may be designed to slip throughout all-wheel drive operation to modulate the torque split between the front and rear axles based on sensed conditions.

The vehicle 20 may include wheel sensors 80 such as individual wheel sensors 80 located at each of the wheels. The wheel sensors 80 are configured to output a signal indicative of an angular velocity of their associated wheel. The wheel sensors 80 are in electric communication with a controller 82. The controller 82 is configured to receive the signals from the wheel sensors 80 and determine a speed for each of the wheels. Using the wheel speeds, the controller can determine the relative speeds between each of the wheels, between each of the axles, between wheels of a same axle, and the like to determine traction conditions (among other things) that are used to control the all-wheel-drive system and other systems of the vehicle. For example, the controller 82 may be programmed to determine the average wheel speed for the front axle based on the speed sensors 80 associated with the front wheels 34, 36, and to determine the average wheel speed for the rear axle 40 based on the speed sensors 80 of the rear wheel 74, 75. The controller 82 may be further programmed to compare the average wheel speeds of the front and rear axles 28 and 40 to determine the relative wheel slip between these axles.

The controller 82, such as a powertrain control unit (PCU), an engine control module (ECM), and an all-wheel drive controller, while illustrated as one controller may be part of a larger control system (see VSC 150 described below) and may be controlled by various other controllers throughout the vehicle 20, such as a vehicle system controller (VSC). It should therefore be understood that the controller 82 and one or more other controllers can collectively be referred to as a "controller" that controls various actuators in response to signals from various sensors to control functions such as starting/stopping of the engine, scheduling transmission shifts, operating the clutches of the all-wheel drive-system etc. Controller 82 may include a one or more microprocessors or central processing units (CPU) in communication with various types of computer-readable storage devices or media as described in detail below.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. The controller 82 may communicate signals to and/or from the engine 22, the transmission 24, the PTU 42, the RDU 46, the wheel sensors 80, and others. Although not explicitly illustrated, those of ordinary skill in the art will recognize various functions or components that may be controlled by controller 82 within each of the subsystems identified above.

FIG. 2 illustrates an alternative all-wheel-drive architecture for a vehicle 100 that has a longitudinally mounted engine 102 and is rear-wheel biased. A transmission 104 is coupled to the engine 102. The output of the transmission 104 is connected to a transfer case 106 that selectively powers the secondary axle (front axle) 108. The transfer case 106 may be configured to always route power to the primary (rear) axle 110 via a rear driveshaft 112. The driveshaft 112 routes power to a rear differential that splits the power between the left and right rear wheels 116 and 118. The front axle 108 includes a front differential 120 that is drivably connected to the transfer case 106 by a front driveshaft 122. Within the transfer case 106 are one or more clutches 124 that selectively couple the front driveshaft 122 to the powertrain. For example, when the vehicle 100 is in a two-wheel drive, the one or more clutches are disengaged to isolate the front axle 108 and propel the vehicle solely with the rear wheels 116, 118. The clutch 124 may be a multi-plate wet clutch. When the vehicle 100 is in four-wheel drive or all-wheel drive, the one or more clutches 124 are engaged to route at least some of the power produced by the engine 102 to the front axle 108. The transfer case 106 may be configured for automatic four-wheel drive or all-wheel drive (this may be a selectable mode, among other modes such as two-wheel drive, four high, four low, etc.) in which the clutch is controlled to continuously provide different torque split between the front axle and the rear axle based on sensed conditions, such as wheel slip. In this type of transfer case, the clutch 124 may be in a state of slip for long periods of time, if not continuously. Applicant's U.S. Pat. No. 7,630,812, which is incorporated by reference in its entirety herein, provides additional description of an example transfer case and clutch that may be used in the vehicle 100.

In both of the above-described illustrated embodiments, as well as other non-illustrated embodiments, one or more clutches of the all-wheel-drive system are controlled to increase and decrease the amount of power routed to the secondary axle. The clutches are controlled by increasing and decreasing the capacity of these clutches, i.e., the torque passing from one side of the clutch to other, such as by increasing and decreasing the pressure applied to a clutch pack, for example.

Figure 3:
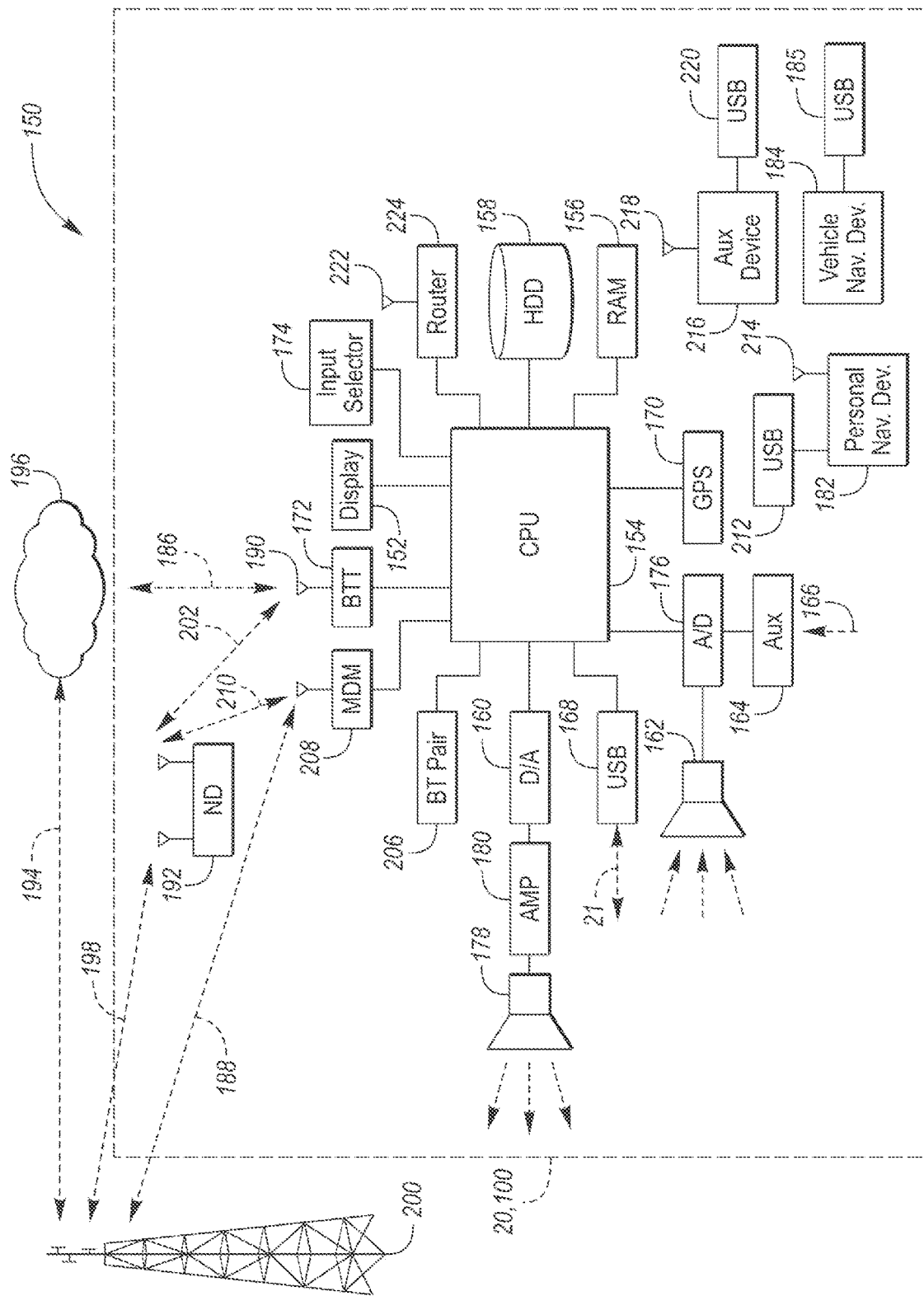
FIG. 3 illustrates an example vehicle computing system.

Referring to FIG. 3, the vehicles 20 and 100 may include a vehicle-based computing system 150 (VCS). The above-described controllers may be part of this vehicle-based computing system. An example of such a vehicle-based computing system 150 is the SYNC system manufactured by THE FORD MOTOR COMPANY. A vehicle enabled with a vehicle-based computing system may contain a visual front end interface (display) 152 located in the vehicle. The user may also be able to interact with the interface if it is provided, for example, with a touch sensitive screen. In another illustrative embodiment, the interaction occurs through, button presses or a spoken dialog system with automatic speech recognition and speech synthesis.

In the illustrative embodiment 150 shown in FIG. 3, a processor 154 controls at least some portion of the operation of the vehicle-based computing system. Provided within the vehicle, the processor 154 allows onboard processing of commands and routines. Further, the processor is connected to both non-persistent 156 and persistent storage 158. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid-state drives, portable USB drives, and any other suitable form of persistent memory.

The processor is also provided with a number of different inputs allowing the user to interface with the processor. In this illustrative embodiment, a microphone 162, an auxiliary input 164 (for input 166), a USB input 168, a GPS input 170, screen 152, which may be a touchscreen display, and a BLUETOOTH input 172 are all provided. An input selector 174 is also provided, to allow a user to swap between various inputs. Input to both the microphone and the auxiliary connector is converted from analog to digital by a converter 176 before being passed to the processor. Although not shown, numerous of the vehicle components and auxiliary components in communication with the VCS 150 may use a vehicle network (such as, but not limited to, a CAN bus) to pass data to and from the VCS 150 (or components thereof).

Outputs to the system can include, but are not limited to, a visual display 152 and a speaker 178 or stereo system output. The speaker is connected to an amplifier 180 and receives its signal from the processor 154 through a digital-to-analog converter 160. Output can also be made to a remote BLUETOOTH device such as personal navigation device (PND) 182 or a USB device such as vehicle navigation device 184 along the bi-directional data streams shown at 186 and 188, respectively.

In one illustrative embodiment, the system 150 uses the BLUETOOTH transceiver 172 to communicate 190 with a user's nomadic device 192 (e.g., cell phone, smart phone, PDA, or any other device having wireless remote network connectivity). The nomadic device can then be used to communicate 194 with a network 196 outside the vehicle, e.g., 20 or 100, through, for example, communication 198 with a cellular tower 200. In some embodiments, tower 200 may be a WiFi access point.

Exemplary communication between the nomadic device and the BLUETOOTH transceiver is represented by signal 202.

Pairing a nomadic device 192 and the BLUETOOTH transceiver 172 can be instructed through a button 206 or similar input. Accordingly, the CPU 154 is instructed that the onboard BLUETOOTH transceiver will be paired with a BLUETOOTH transceiver in a nomadic device.

Data may be communicated between CPU 154 and network 196 utilizing, for example, a data-plan, data over voice, or DTMF tones associated with nomadic device 192. Alternatively, it may be desirable to include an onboard modem 208 having antenna in order to communicate 210 data between CPU 154 and network 196 over the voice band. The nomadic device 192 can then be used to communicate with a network 196 outside the vehicle through, for example, communication 198 with a cellular tower 200. In some embodiments, the modem 208 may establish communication 188 with the tower 200 for communicating with network 196. As a non-limiting example, modem 208 may be a USB cellular modem and communication 188 may be cellular communication.

In one illustrative embodiment, the processor 154 is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 192 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G/5G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 192 is replaced with a cellular communication device (not shown) that is installed to the vehicle. In yet another embodiment, the ND 192 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 154. In the case of certain temporary data, for example, the data can be stored on the HDD or other storage media 158 until such time as the data is no longer needed.

Additional sources that may interface with the vehicle include a personal navigation device 182, having, for example, a USB connection 212 and/or an antenna 214, a vehicle navigation device 184 having a USB 185 or other connection, an onboard GPS device 170, or remote navigation system (not shown) having connectivity to network 196. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 154 could be in communication with a variety of other auxiliary devices 216. These devices can be connected through a wireless 218 or wired 220 connection. Auxiliary devices 216 may include, but are not limited to, personal media players, wireless health devices, portable computers, and the like.

Also, or alternatively, the CPU could be connected to a vehicle based wireless router 73, using for example a WiFi (IEEE 803.11) 222 transceiver. This could allow the CPU to connect to remote networks in range of the local router 224.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

The clutch or clutches of the transfer case or other subassembly of the all-wheel-drive powertrain are designed to slip continuously without creating excessive wear or drivability issues under normal driving conditions. Slipping of the clutch generates heat and these systems are designed to manage that heat. Excessive slip of the clutch, however, can reduce longevity or the wear components. The vehicle may be programmed to automatically intervene if excessive heat is detected. For example, the controller may be programmed to determine a temperature of the clutch and compare that temperature to one or more thresholds or limits in order to determine if an over-temperature condition is present. The temperature of the clutch may be inferred from the temperature of the transfer case or other component that houses the clutch. The vehicle may include a sensor that measures the temperature of the oil within the transfer case in order to determine a temperature of the clutch. Of course, other methodologies may be used to determine the temperature of the clutch.

In one example embodiment, the controller is provided with a database including at least a reference clutch temperature (i.e., a threshold), and a signal indicating the beginning of the execution of the algorithm. The controller initializes a running arithmetic sum in response to the signal, and it repetitively calculates at frequent intervals, during execution of the algorithm, the change of temperature of the clutch during each interval. The controller repetitively updates the running sum with the calculated change of clutch temperature over each interval, and it repetitively compares the reference clutch temperature and the magnitude of the running sum. If the magnitude of the running sum equals or exceeds the reference clutch temperature, a temperature flag is issued. In response the flag, the controller may initiate one or more mitigating actions such as locking the clutch or reducing power output of the engine and/or electric motor. Some all-wheel-drive powertrains do not have the hardware for locking the clutch. Here, the vehicle may be to power limited until the clutch sufficiently cools.

Off-road driving, especially on loose surfaces—such as sand, can warm the clutches due to the large amount of wheel slip these surfaces tend to induce. If the temperature of the clutch exceeds an upper limit, the vehicle may enter a power limiting mode until the clutch cools below a threshold which may or may not be the same value as the upper limit. A driver message typically accompanies entry of the power-limiting mode. It may be possible to mitigate this by providing proactive instruction to the driver. Providing proactive instruction allows the driver to take mitigating actions prior to the upper threshold being exceeded. This may result in less instances of power limiting.

As described above in FIG. 3 and the related text, the vehicle may include connected vehicle (CV) technology such as applications, services, and technologies that connect the vehicle to its surroundings. Based on CV technology, an off-road map can be created based on a customer's driving data. The off-road map can provide route preview and terrain information to the vehicle control system, e.g., VCS 150. The vehicle may more closely monitor the driveline temperatures, such as clutch temperature, during off-road driving.

When the map data indicates that the vehicle is driving off-road, the one or more clutches of the all-wheel drive system are controlled according to a different operating mode, which may be referred to as off-road transfer torque control mode (TTC). In this mode, instead of just comparing the driveline temperature(s) to upper limit temperature(s), the vehicle may also compare the temperature(s) to one or more intermediate thresholds. The intermediate threshold(s) can be used to provide the above-described proactive instructions. For example, in response to the intermediate temperature threshold being exceeded, the vehicle may display a message to the driver informing them that the driveline is approaching a temperature limit. The message may include advice for mitigating heat generation. For example, a message may suggest reducing the driver-demanded torque, e.g., reducing depression of accelerator pedal. Should this proactive approach prove unsuccessful in limiting clutch temperature, the upper limit still operates to trigger the power limiting mode.

Control logic or functions performed by controller. e.g., controller 82, may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 4:
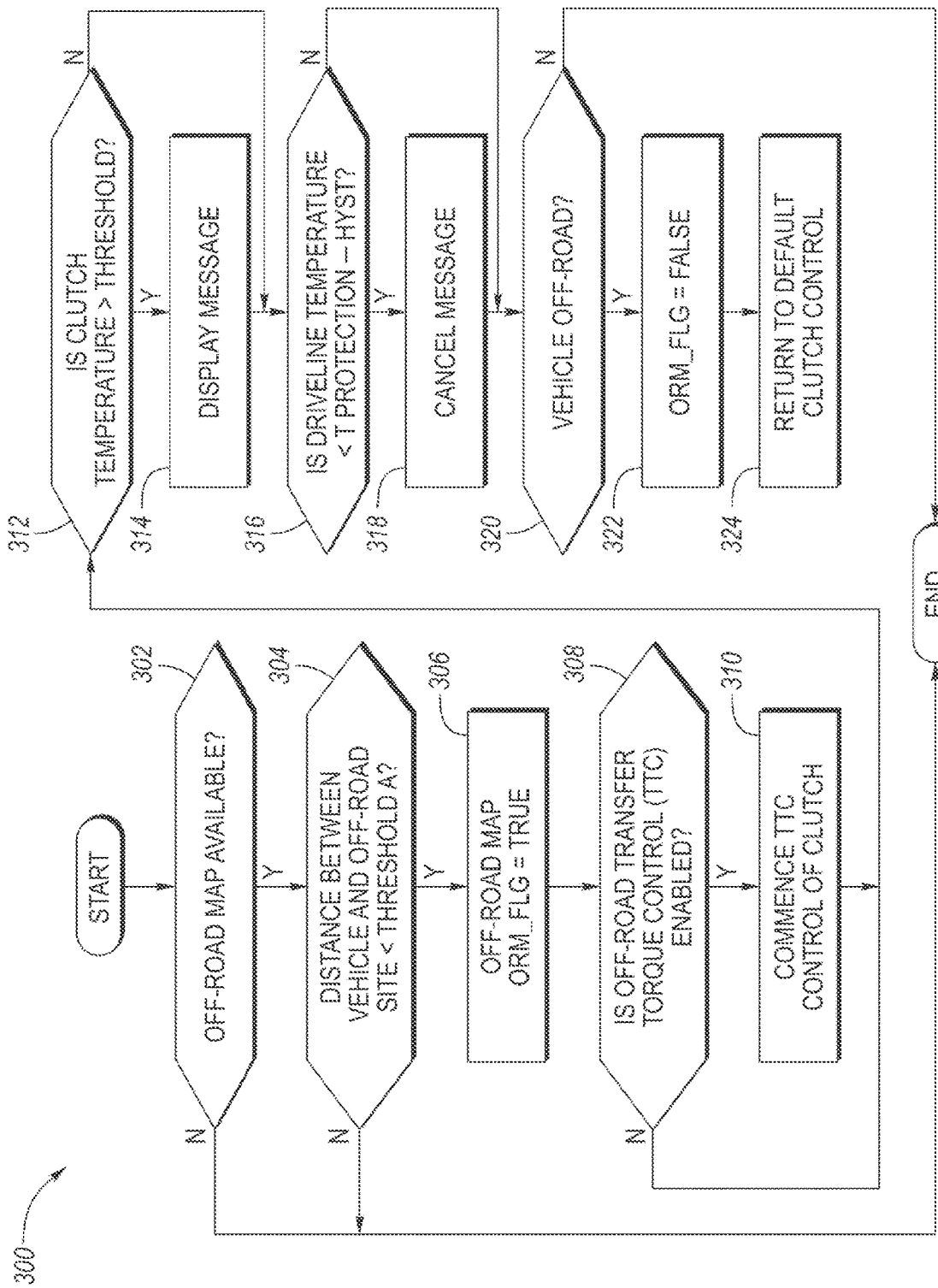
FIG. 4 is a flowchart of an algorithm for controlling a driveline clutch during an off-road transfer torque control mode.

FIG. 4 is a flowchart 300 of an algorithm for controlling the clutch(es) on an all-wheel-drive system during TTC. Control begins at operation 302 where the vehicle determines if an off-road map is available. If no, control is exited. In operation 304, the controller determines if the distance between the vehicle and an off-road site is less than a first threshold (threshold A), i.e., is the vehicle off-road? If yes, an off-road map flag is set to TRUE at operation 306. In operation 308, the controller determines if TTC is enabled. If yes, the controller commences TTC at operation 310.

During TTC, the clutch is controlled differently than the normal operating mode. For example, during TTC, the clutch is controlled to slip less than during normal operating mode. Clutch slip can be reduced by increasing the capacity of the clutches, which results in more of the powerplant torque, e.g., engine torque, being routed to the secondary axle. During TTC, the clutch may still be controlled to slip, or in some instances may be fully locked, to encourage low-temperature operation of the clutch. During normal driving, this may not be the optimum torque split. However, during off-road driving, it is frequently advantageous to equally divide the powerplant torque between both the primary and the secondary axles due to the rugged terrain. During TTC, the amount of slip may be based on the terrain, which may be determined using the map data, or may be determined through other inputs such as the wheel speed sensors, torque sensors, or the like. The vehicle may reduce clutch slip by locking the clutch during off-road driving. Alternatively, the slip may be reduced by modifying a gain associated with slip of the clutch such that slip of the clutch is reduced. For example, the gain may result in higher pressures to the clutches thus resulting in higher clutch capacity and reduced slip. In another embodiment, the slip may be reduced by setting a torque capacity floor for the clutch. The floor is set to a value that corresponds to less slip than during a normal operating mode of the vehicle. While these slip-reducing actions were described above as occurring in response to being in the TTC, in other embodiments, these slip-reducing actions may be initiated in response to being in TTC and a temperature of the clutch exceeding a threshold. In some embodiments, the slip-reducing actions may be omitted.

At operation 312, the controller determines if the clutch temperature exceeds an intermediary or lower threshold, which is less than the upper limit of the clutch. If the lower threshold is exceeded, control passes to operation 314 and the controller displays a message to the driver. The message may include text, images, or both that convey to the driver that the clutch is becoming hot and that mitigating action should be taken. The message may include instructions for reducing slip of the clutch. For example, the message may instruct the driver to slow down or release depression of the accelerator pedal. The message may be displayed in the instrument cluster or on the display of the radio head. In some embodiments, the controller may also reduce the target slip of the clutch in response to the lower threshold being exceeded (see operation 310 above). This may include but is not limited to locking the clutch.

At operation 316, the controller determines if the clutch has cooled. For example, the controller may determine if the driveline temperature is less than the lower threshold less a hysteresis value. If yes, the controller cancels the message and/or issues a new message informing the driver that he may resume full performance of the vehicle at operation 318. In operation 320, the controller determines if the vehicle is no longer off-road. For example, the controller may determine if the distance between the vehicle and the off-road site is greater than a second threshold (threshold B). If yes, the off-road map flag is set to FALSE at operation 322, and the controller returns the clutch control to the default at operation 324. During normal operation, the clutch temperatures may be compared to a higher threshold that, if exceeded, triggers the driver message.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an engine;
   a primary axle drivably connected to the engine;
   a secondary axle drivably connected to the engine by a clutch; and
   a controller programmed to:
   in response to map data indicating that the vehicle is off-road, enable an off-road transfer torque control mode in which temperatures of the clutch are compared to a lower threshold, and, in response to the temperature of the clutch exceeding the lower threshold, display a message to a driver indicative of rising temperatures of the clutch, and in response to a temperature of the clutch exceeding an upper limit, enable a power limiting mode in which torque of the engine is limited to a predefined value.

2. The vehicle of claim 1, wherein the controller is further programmed to, in response to the map data indicating that the vehicle is on-road, (i) disable the off-road transfer torque control mode, (ii) compare temperatures of the clutch to an upper threshold, and (iii) display the message responsive to the upper threshold being exceeded.

3. The vehicle of claim 1, wherein the controller is further programmed to, during the off-road transfer torque control mode, lock the clutch responsive to the lower threshold being exceeded.

4. The vehicle of claim 1, wherein the controller is further programmed to, during the off-road transfer torque control mode, modify a gain associated with slip of the clutch such that the slip of the clutch is reduced.

5. The vehicle of claim 1, wherein the controller is further programmed to, during the off-road transfer torque control mode, set a torque capacity floor for the clutch such that slip of the clutch is reduced.

6. The vehicle of claim 1, wherein the clutch is a wet clutch.

7. The vehicle of claim 1, wherein the vehicle further includes a transfer case, and the clutch is disposed within the transfer case.

8. The vehicle of claim 1, wherein the vehicle further includes a differential, and the clutch is disposed within the differential.

9. A vehicle comprising:
a powertrain including a clutch; and
a controller programmed to:
during on-road driving, compare a temperature of the clutch to a higher threshold and, responsive to the temperature of the clutch exceeding the higher threshold, display a message indicative of rising temperatures of the clutch, and
during off-road driving, compare the temperature of the clutch to a lower threshold and, responsive to the temperature of the clutch exceeding the lower threshold, display the message.

10. The vehicle of claim 9, wherein the controller is further programmed to, in response to a temperature of the clutch exceeding an upper limit, enable a power limiting mode in which torque of the powertrain is limited to a predefined value.

11. The vehicle of claim 9, wherein the controller is further programmed to lock the clutch during the off-road driving responsive to the lower threshold being exceeded.

12. The vehicle of claim 9, wherein the controller is further programmed to, during the off-road driving, modify a gain associated with slip of the clutch such that the slip of the clutch is reduced.

13. The vehicle of claim 9, wherein the controller is further programmed to, during the off-road driving, set a torque capacity floor for the clutch such that slip of the clutch is reduced.

14. The vehicle of claim 9, wherein the vehicle further includes a transfer case, and the clutch is disposed within the transfer case.

15. The vehicle of claim 9, wherein the vehicle further includes a differential, and the clutch is disposed within the differential.

16. A method of controlling a clutch of a vehicle during off-road driving, the method comprising:
in response to map data indicating that the vehicle is off-road, enabling an off-road transfer torque control mode in which temperatures of the clutch are compared to a lower threshold; and
in response to the temperature of the clutch exceeding the lower threshold, displaying a message to a driver indicative of rising temperatures of the clutch.

17. The method of claim 16 further comprising, in response to a temperature of the clutch exceeding an upper limit, enabling a power limiting mode in which engine torque is limited to a predefined value.

18. The method of claim 16 further comprising, in response to the map data indicating that the vehicle is on-road, (i) disabling the off-road transfer torque control mode, (ii) comparing temperatures of the clutch to an upper threshold, and (iii) displaying the message responsive to the upper threshold being exceeded.

19. The method of claim 16 further comprising modifying a gain associated with slip of the clutch during the off-road transfer torque control mode such that the slip of the clutch is reduced.

20. The method of claim 16 further comprising setting a torque capacity floor for the clutch during the off-road transfer torque control mode such that slip of the clutch is reduced.

* * * * *